(No Model.)

A. J. & J. M. SMITH.
VEHICLE WHEEL.

No. 301,399. Patented July 1, 1884.

Witnesses

Inventors:
Andrew J. Smith
and Jas. M. Smith,
per Edson Bros.
Attorneys.

UNITED STATES PATENT OFFICE.

ANDREW J. SMITH AND JAMES M. SMITH, OF MILNER, ALABAMA.

VEHICLE-WHEEL.

SPECIFICATION forming part of Letters Patent No. 301,399, dated July 1, 1884.

Application filed November 2, 1883. (No model.)

*To all whom it may concern:*

Be it known that we, ANDREW J. SMITH and JAMES M. SMITH, each of Milner Post-Office, of the county of Randolph and State of Alabama, have invented a new and useful Improvement on a Vehicle-Wheel, by which the tire can be tightened without removing it from the wheel; and we do hereby declare that the following is a full, clear, and exact description of the construction and operation of the same, reference being had to the annexed drawings, making a part of the specification, in which—

Figure 1:
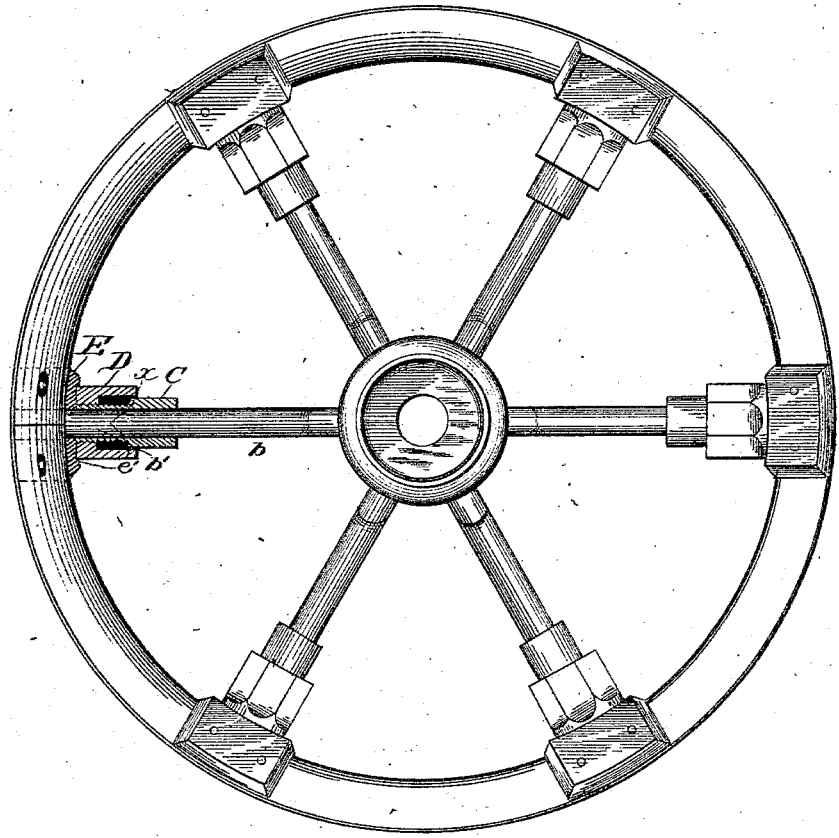
Figure 2:
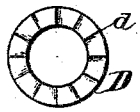
Figure 3:
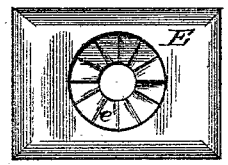

Figure 1 is a side elevation of our wheel, partly in section. Figs. 2 and 3 are details.

This invention relates to vehicle-wheels, our object being to provide a strong and durable wheel, in which the tire can be easily and readily tightened by simply turning a series of nuts, and thereby saving the expense and delay of employing skilled labor; and it consists of the combination and arrangement of parts, as will be hereinafter more fully set forth, and particularly pointed out in the claims.

In the drawings, B represents the spokes of the wheel, which are made in two parts, $b$ $b'$, which are divided at the line $x$. The inner part, $b$, is made of iron or other metal. On the reduced portion of this sleeve C is a screw-thread extending from the shoulder toward the inner end of the sleeve, said sleeve being enlarged at its inner end to closely fit the inner end of the nut, to be hereinafter described, the length of the thread on the nut and that on the sleeve being such as to permit of sufficient adjustment of the nut to tighten the tire.

D represents a nut with a thread on the inside, fitting and working on a thread of sleeve C, which is rigidly secured to or made in one piece with the part $b'$ of the spoke. The inner end of the nut houses the threads on the sleeve, thereby excluding grit, dust, &c. The outer end of the felly-plates is circular in form, and has a ratchet, $d$, on it, to fit a corresponding ratchet, $e$, on the sleeve C.

E represents the felly-plates, made of iron or other metal, and in shape to cover the fellies up to the tire, and correspond to the circular form of the fellies. The center of the part next to the nut D has a circular indenture, $e'$, within which the ratchet $e$ is formed in aid of the successful working of the ratchet on nut D, which also has a hole through said indenture, through which the tenon or outer end of the spoke passes.

F represents the fellies, which are joined in the felly-plates E around the tenon or spoke $b'$. Near the joint of the fellies there is a slot in each felly, through which the rivets pass from each outer corner of the felly-plates. The edges of each felly-plate are beveled to prevent the accumulation of dust and mud.

G represents the tire.

By running out the nuts D the spokes are lengthened, being separated at the line $x$, and the fellies are extended to the tire when loose, and made to fit tight therein. The slots are for the purpose of allowing the fellies to expand when the nuts D are run out. The rivets are to secure and strengthen the upper part of the felly-plates E. The beveled joint in the spokes B serves to prevent the sleeve C from turning when the nuts D are run out. The ratchet on the nuts and felly-plates E are to prevent the nuts D from turning backward from any cause, such as jolting of the vehicle, &c. The indentures in the felly-plates E are to hold the spokes firm and secure.

It is obvious that our invention can be applied to all kinds of wheeled vehicles, such as wagons, carts, traction-engines, &c.

We are aware that changes and modifications in the construction of the parts can be made without departing from the spirit or sacrificing the advantages of our invention—as, for instance, the felly-plates need not extend to the tire, nor the indenture made therein, nor the inner end of sleeve enlarged. We would therefore have it understood that we can make such changes as fairly fall within the scope of our invention.

Having thus fully described our invention, what we claim, and desire to secure by Letters Patent, is—

1. A spoke in two parts; one part secured to the hub, the other part having a threaded sleeve rigidly secured thereto and extended over the joint in the spoke, in combination with a felly-plate and a nut, as and for the purpose set forth.

2. The spoke B, in two parts, the outer part having a threaded sleeve rigidly secured thereto, in combination with a nut having a ratchet on its outer end or face, and a felly-plate also having a ratchet, as and for the purpose set forth.

3. The combination of the perforated felly-plate having a ratchet within an indenture therein, slotted fellies, ratchet-nut, and sleeve, the sleeve adapted to telescope within the nut and the spoke, as and for the purpose set forth.

ANDREW J. SMITH.
JAS. M. SMITH.

Witnesses:
W. H. SMITH, Jr.,
R. T. WEST.